US008218869B2

(12) United States Patent
Porikli et al.

(10) Patent No.: US 8,218,869 B2
(45) Date of Patent: Jul. 10, 2012

(54) IMAGE SEGMENTATION USING SPATIAL RANDOM WALKS

(75) Inventors: Fatih M. Porikli, Watertown, MA (US); Rui Li, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 711 days.

(21) Appl. No.: 12/413,593

(22) Filed: Mar. 29, 2009

(65) Prior Publication Data

US 2010/0246956 A1    Sep. 30, 2010

(51) Int. Cl.
    *G06K 9/34* (2006.01)
(52) U.S. Cl. ........................................ 382/173
(58) Field of Classification Search .................. None
    See application file for complete search history.

(56) References Cited

U.S. PATENT DOCUMENTS

| | | | | |
|---|---|---|---|---|
| 6,031,935 | A * | 2/2000 | Kimmel | 382/173 |
| 7,680,312 | B2 * | 3/2010 | Jolly et al. | 382/128 |
| 2002/0184470 | A1 * | 12/2002 | Weese et al. | 712/1 |
| 2003/0099391 | A1 * | 5/2003 | Bansal et al. | 382/131 |
| 2003/0198382 | A1 * | 10/2003 | Chen et al. | 382/173 |
| 2005/0238215 | A1 * | 10/2005 | Jolly et al. | 382/128 |
| 2006/0050959 | A1 * | 3/2006 | Grady et al. | 382/173 |
| 2006/0120524 | A1 | 6/2006 | Avidan et al. | |
| 2006/0159343 | A1 * | 7/2006 | Grady | 382/180 |
| 2006/0239553 | A1 * | 10/2006 | Florin et al. | 382/173 |
| 2006/0251302 | A1 * | 11/2006 | Abufadel et al. | 382/128 |
| 2006/0285745 | A1 * | 12/2006 | Paragios et al. | 382/173 |
| 2007/0014473 | A1 * | 1/2007 | Slabaugh et al. | 382/173 |
| 2007/0025616 | A1 * | 2/2007 | Grady et al. | 382/173 |
| 2008/0037871 | A1 * | 2/2008 | Sinop et al. | 382/173 |
| 2009/0052763 | A1 * | 2/2009 | Acharyya et al. | 382/132 |

OTHER PUBLICATIONS

Lai, Yu-Kun, et al. "Fast mesh segmentation using random walks", ACM 2008.*
Jurgeo Weese, et al. "Shape constrained deformable models for 3D medical image segmentation", IPMI 2001.*
Grady: "Random walks for image segmentation," IEEE Trans. on Pattern Analysis and Machine Intelligence (PAMI), 28:1768-1783, 2006.
Grady, "Multilabel random walker image segmentation using prior models," in Proc. IEEE Conf. on Computer Vision and Pattern Recognition (CVPR), 2005.

* cited by examiner

*Primary Examiner* — Li Liu
(74) *Attorney, Agent, or Firm* — Dirk Brinkman; Gene Vinokur

(57) ABSTRACT

The embodiments of the invention describe a method for segmenting an image. We perform an initial segmentation of the image to produce a previous segmented region and segment iteratively the image using a spatial random walk based on a shape prior of the previous segmented region to produce a next segmented region. We compare the next segmented region with the previous segmented region, and repeat the segmenting and the comparing until the previous and next segmented regions converge. After that, we select the next segmented region as a final segmented region.

17 Claims, 4 Drawing Sheets

100

IMAGE SEGMENTATION USING SPATIAL RANDOM WALKS

FIELD OF THE INVENTION

This invention relates generally to computer vision, and more particularly to image segmentation.

BACKGROUND OF THE INVENTION

In computer vision, segmentation refers to the process of partitioning a digital image into multiple regions, i.e., disjoint sets of pixels. The goal of the segmentation is to simplify and/or change the representation of the image into something that is more meaningful and easier to analyze. Segmentation is typically used to locate objects and boundaries in images. The result of image segmentation is a set of regions, or a set of contours extracted from the image.

However, automatic segmentation of an object in an image is challenging in the presence of image noise, background clutter and occlusions. In semi-automatic segmentation, a user specifies a region of interest (ROI), and segmentation methods are applied such that a countour that best fits the object in ROI in the image is determined.

A random walk (RW) is a mathematical formalization of a trajectory that includes taking successive random steps. Specific cases or limits of random walks include the drunkard's walk and Lévy flight. Random walks are related to diffusion models and are a fundamental topic in discussions of Markov processes. Properties of random walks, including dispersal distributions, first-passage times and encounter rates are well known.

An image can be segmented using random walk segmentation by solving a sparse system of linear equations, Grady: "Random walks for image segmentation," IEEE Trans. on Pattern Analysis and Machine Intelligence (PAMI), 28:1768-1783, 2006.

Grady also describes the incorporation of prior information into the random walk segmentation, Grady, "Multilabel random walker image segmentation using prior models," in Proc. IEEE Conf. on Computer Vision and Pattern Recognition (CVPR), 2005. The prior information used is color prior probabilities in the form of a Gaussian mixture learned from training data.

However, the color prior probabilities do not always produce satisfactory result for the random walk segmentation, e.g., in the presence of image noise, background clutter and occlusions. Thus, it is desired to use the random walk segmentation with other types of prior information.

SUMMARY OF THE INVENTION

It is an object of the invention to provide a method for segmentation using spatial random walks segmentation.

The invention is based on the realization that a segmented object is conformed to a spatial constraint, and incorporating a spatial constraint into the spatial random walks segmentation leads to a superior segmentation results.

Therefore, embodiments of our invention incorporates a shape prior into the random walks segmentation method. Using the shape prior representation and associated with the shape prior distance measures, we are segmenting objects of complex shapes even in the presence of image noise, background clutter and occlusion. Furthermore, some embodiments of the invention selects the shape prior from multiple shape priors for particular segmentation.

We first obtain an initial segmentation from any conventional segmentation methods and align the shape prior with the initial segmentation. Once aligned, we segment iteratively the image using a spatial random walk based on a shape prior of the previous segmented region to produce a next segmented region. We compare the next segmented region with the previous segmented region, and repeat the segmenting and the comparing until the previous and next segmented regions converge. After that, we select the next segmented region as a final segmented region.

DETAILED DESCRIPTION OF THE PREFERRED EMBODIMENT

Figure 1:
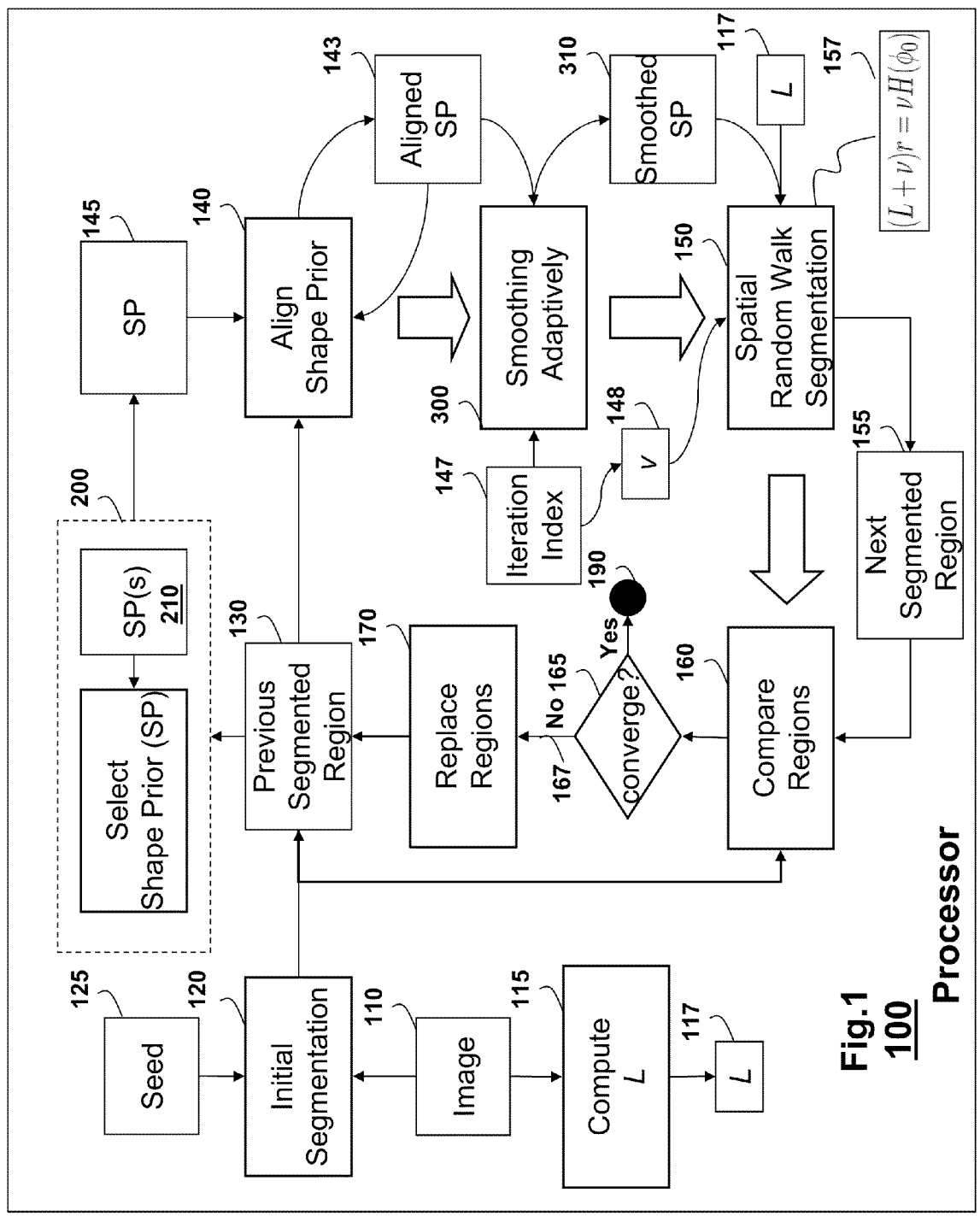
FIG. 1 is a flow chart of a method and a system for segmenting an image using spatial random walk segmentation based on a shape prior according to embodiments of the invention.

FIG. 1 shows a method and a system 100 for segmenting an image 110 with a spatial random walk segmentation 150 based on a shape prior 145. The steps of the method are performed in a processor.

The image 110 is segmented 120 to produce a segmented region 130. For example, in one embodiment we use a random walk segmentation for the initial segmentation of the image based on a seed 125. The seed is selected, by a user specifying a region of interest (ROI) in the image. A Laplacian matrix 117 of the image 110 is computed 115 and provided as an input to the spatial random walk segmentation 150. The image 110 with the final segmented region 190 is an output of the method 100.

The embodiments of the invention iteratively segment 150 the image the with spatial random walk segmentation based on the shape prior 145 to produce a next segmented region 155 until 160 the next segmented region converges with the previous segmented region 130. After the converging, we select the next segmented region as the output segmented region 190.

The shape prior is a predetermined shape of a region to be segmented, i.e., the segmented region 190. In one embodiment, the shape prior has a different scale or orientation as the region 190. Only a general similarity is required. For some applications the region to be segmented is known, e.g., we are segmenting an eye in an image of a face. However, the shape prior can have an arbitrary form. For example, if the region 190 is a tumor to be segmented on a scan image, the shape prior can be acquired from previous tumor segmentations. Furthermore, if the method is used for tracking an object, the prior shape can be received from previous tracking results. In alternative embodiment, the shape prior 145 is selected 200 from a set of shapes priors 210, as described below.

In some embodiments, before the shape prior is provided to the spatial random walk segmentation, we first align 140 the shape prior with the previous segmented region 130, and next smooth 300 the aligned shape prior 143. Hence, a smoothed aligned version 310 of the shape prior is provided to the segmentation.

In one embodiment, we smooth the aligned shape prior adaptively, based on a value of the interaction index 147, as described in greater details below.

If another iteration of the segmenting 150 is necessary 167, then the previous segmented region is replaced 170 with the result of the segmentation, i.e., the next segmented region. Accordingly, we repeat the alignment, increase an iteration index 147, and repeat the segmenting 150.

In one embodiment, we use the original shape prior 145 for the alignment. However, in another embodiment, the aligned shape prior 143 determined during the previous iteration of the segmentation is used for the alignment 140.

Selecting Shape Prior

Figure 2:
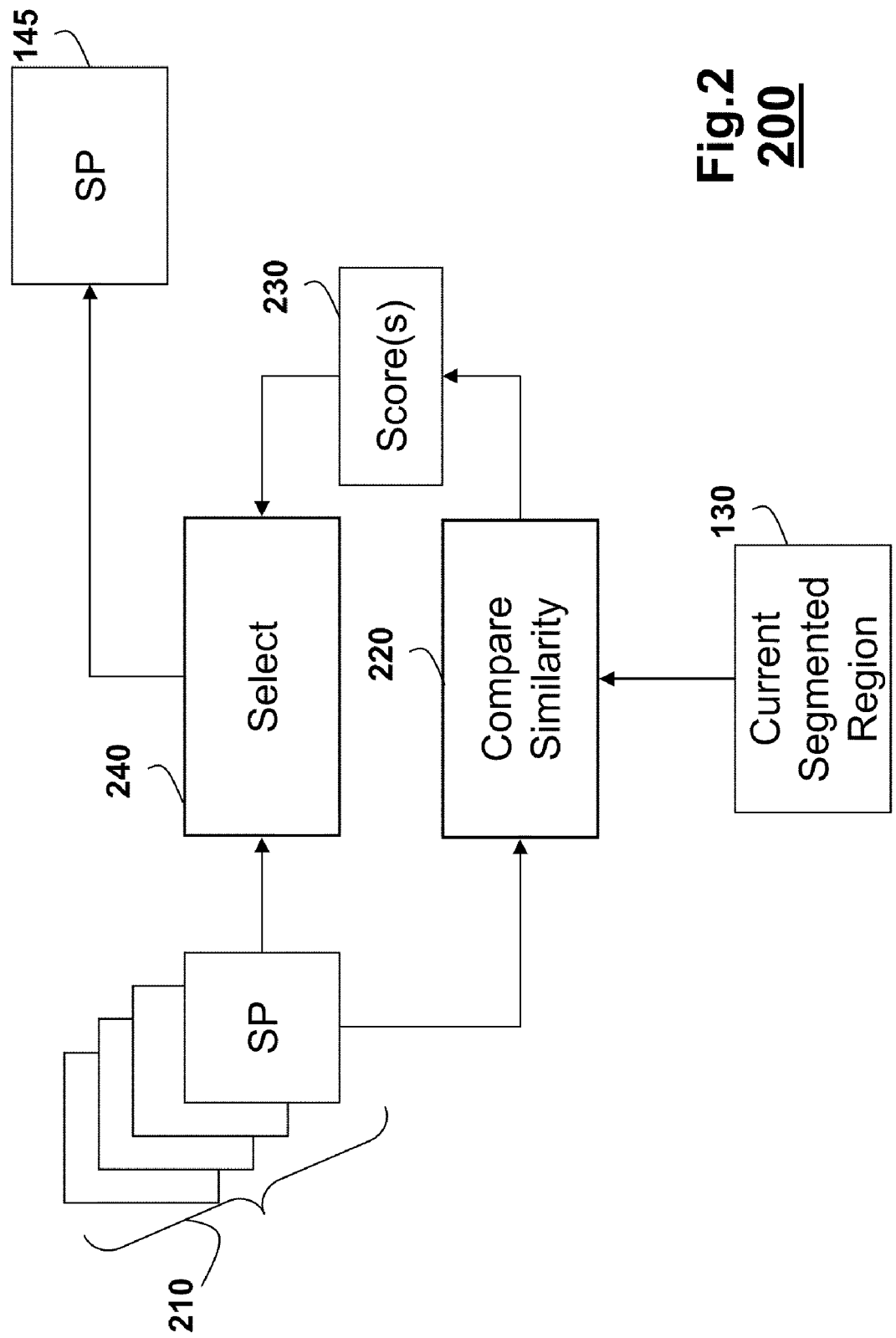
FIG. 2 is a block diagram of a method for selecting a shape prior from a set of shape priors according to the embodiments of the invention.

FIG. 2 shows a method for selecting the shape prior from the set of shape priors. The segmented region 130, typically received from the initial segmentation 120, is compared 220 with each shape prior from the set of shape priors 210 to produce a set of similarity scores 230.

In one embodiment, the similarity score is determined by comparing pixel intensities. We select 240 the shape prior 145 having a highest similarity score from the set of similarity scores.

Alignment

In one embodiment, we align the shape prior to the current segmentation results using a difference between affine transformed versions of the shape prior on the segmented region. We select the transformation that gives the minimum difference. Because an exhaustive search is time consuming, some embodiments use fast search, such as first aligning the center of masses of the shape priors and the segmented region, and then solving for the rotation and scale, etc. One embodiment uses a RANdom SAmple Consensus (RANSAC) based alignment. In alternative embodiment, we use image normalization that is invariant to translation, rotation, scaling and skew.

Smoothing

Figure 3:
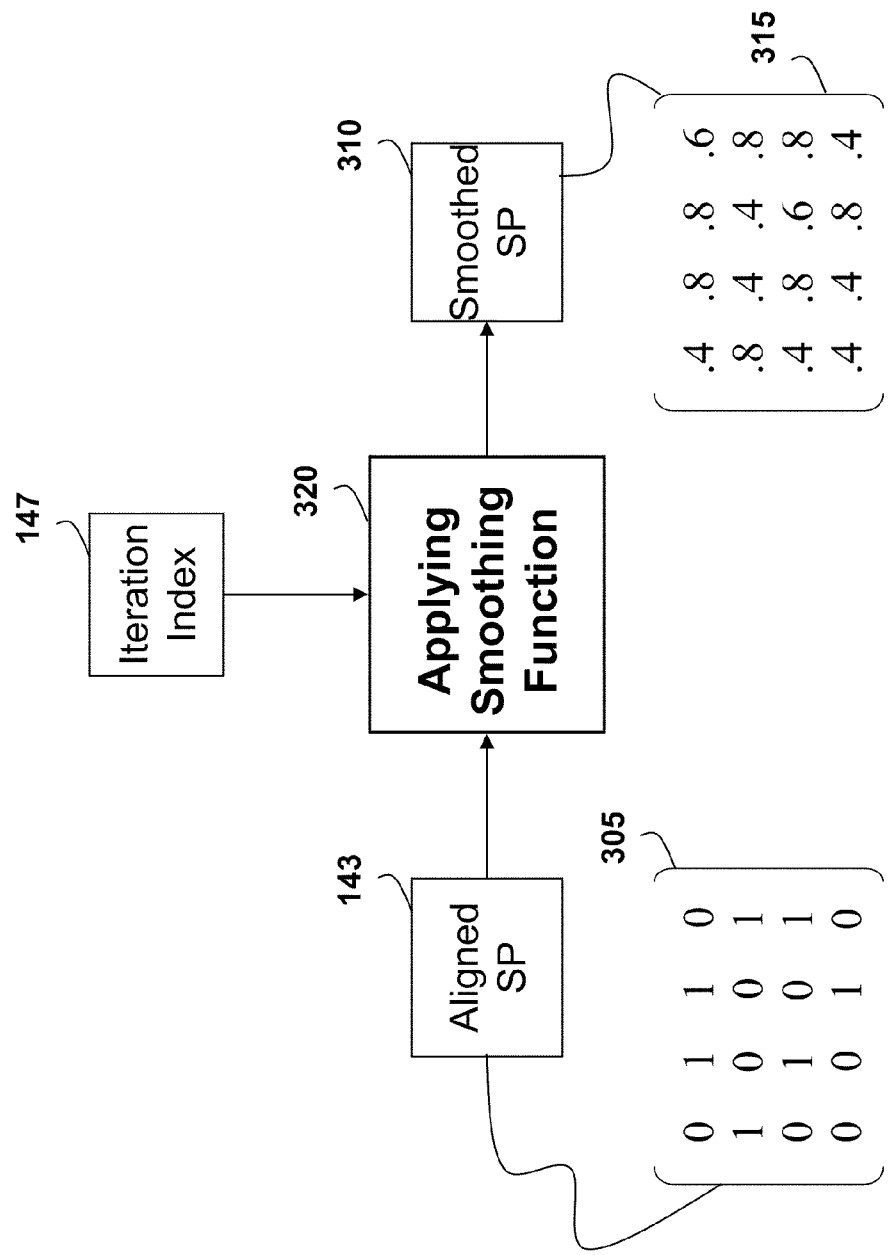
FIG. 3 is a block diagram of a method for smoothing a shape prior according to the embodiments of the invention.

FIG. 3 shows a method for smoothing 300 of the aligned shape prior. Smoothing takes a binary or continuous valued shape prior 305 and generates another shape prior by applying a smoothing function 320, e.g., a unit step function. Thus, the resulting shape prior 310 is smoothed. In other words, instead of having only object or background values, i.e., 0 and 1 values 305, the smoothed version 310 assigns smoothly changing probability values 315.

In one embodiment, parameters of the smoothing function are adjusted depending on the iteration index. As the next segmentation converges to the given shape, the value of the shape prior in the special random walk segmentation is increased, as well to enforce better shape matching.

Converging means that the next segmented region is similar to the previous regions. In other words, the segmentation has stabilized. In one embodiment, we allow minor changes due to oscillations.

Random Walk Segmentation

The segmentation method of the seeded image uses a random walk starting from each pixel of the input image until a labeled seed pixel is reached. This is equivalent to minimization of the Dirichlet integral:

$$\mathcal{D}[u] = \frac{1}{2}\int_\Omega |\nabla u|^2 d\Omega, \tag{2}$$

for a field u and a region $\Omega$. The Euler-Lagrange equation for Equation (2) is the Laplace transform:

$$\nabla^2 u = \Delta u = \text{div grad} u = 0, \tag{3}$$

where div stands for divergence and grad stands for gradient. Based on the definition of harmonic functions, the solution that minimizes Equation (2) is a harmonic function because harmonic functions satisfy the Laplace transform in Equation (3).

The problem of finding the harmonic function u subject to boundary values is "Dirichlet boundary problem." In the context of image segmentation, the Dirichlet boundary problem is defined on a graph G={V, E} including vertices V connected by edges E. Each vertex $v_i$ represents a pixel i in the image, and an edge $e_{ij}$ represents the connection between vertices $v_i$ and $v_j$ according to an adjacency operator. A corresponding weight $w_{ij}$ of the edge represents a strength of the connection between two vertices and introduces bias into the random walk.

The combinatorial formulation of Equation (2) is $$\mathcal{D}[r] = \frac{1}{2} r^T L r, \tag{4}$$

where r is a harmonic function in the image domain, and L is a combinatorial divergence and gradient (div grad) operator. L is the Laplacian matrix in which each coefficient corresponds to a pixel, and indicates a likelihood of the pixel is being from a class $$L_{ij} = \begin{cases} d_i & \text{if } i = j; \\ -w_{ij} & \text{if } v_i \text{ and } v_j \text{ are adjacent nodes}; \\ 0 & \text{otherwise}; \end{cases} \tag{5}$$

where $$d_i = \sum_i w_{ij}$$

if $e_{ij} \in E$. Hence, the solution of the Dirichlet boundary problem is $$Lr = 0 \tag{6}$$

The Laplacian matrix L has a rank of at most N−1, where N is the number of pixels in the image. As a result, Equation (6) is singular and is solved, for example, by providing labels for some of the pixels, which makes Equation (6) conditioned.

We partition the function r as $r_M$ for labeled pixels, i.e., seeds and $r_U$ for unlabeled pixels. By reordering the entries in the matrix L, we rewrite Equation (4) as $$\mathcal{D}(r_U) = \frac{1}{2}[r_M^T r_U^T]\begin{bmatrix} L_M & B \\ B^T & L_U \end{bmatrix}\begin{bmatrix} r_M \\ r_U \end{bmatrix}.$$

By taking derivatives of $\mathcal{D}(r_U)$ with respect to $r_U$ and zero, we obtain the following system of linear equations:

$$L_U r_U = -B^T r_M, \tag{7}$$

wherein B is portion of the matrix L, T is a transpose operator.

The solution of Equation (7) is a sparse, symmetric, positive-definite.

A function $r_i^s$ assigns a probability to vertex $r_i$ for taking on label s, where $s \in \{1, 2, \ldots, K\}$. Given that $r_M$ for the labeled pixels have values of 0 or 1, the $r_M$ on the right-hand side of Equation (7) can be replaced by the 0 or 1 of matrix M, where each row of M is a length K indicator vector:

$$m_j^s = \begin{cases} 1 & \text{if the seed } v_j \text{ is labeled as } s; \\ 0 & \text{if the seed } v_j \text{ take on other labels.} \end{cases}$$

Therefore, for label s, the solution for $x^s$ is obtained by solving:

$$L_U r^s = -B^T m^s,$$

and for all labels:

$$L_U R = -B^T M.$$

Let dim(•) denotes the dimensionality of a given matrix, we have $\dim(L_U)=N_U \times N_U$, $\dim(R)=N_U \times K$, $\dim(B)=N_M \times N_U$ and $\dim(M)=N_M \times K$, where $N_U$ represents the number of unmarked pixels, $N_M$ is the number of marked pixels and therefore $N=N_U+N_M$. Because $r_i^s$ is the probability of vertex $v_i$ taking on label s, $r_i$ satisfies the following condition:

$$\sum_s^K r_i^s = 1, \forall v_i \in V,$$

only K−1 sparse linear systems need to be solved.

Spatial Random Walk Segmentation

The spatial random walk segmentation uses a linear equation 157

$$(L+v)r = vH(\phi_0),$$

wherein L is a Laplacian matrix, v is the weight of the shape prior during the segmentation, H(•) is the smoothing function, $\phi_0$ is the shape prior, and r is a vector describing the next segmented region.

Each coefficient in the Laplacian matrix corresponds to a link between a pair of pixels. The value of the coefficient is based on the application.

In one embodiment, if two pixels are not adjacent, then the coefficient is zero. Otherwise, the coefficient has a value derived from intensity values of the two adjacent pixels. The values of diagonal coefficients are the negative of the sum of the coefficients corresponding to the adjacent pixels. The Laplacian matrix, sometimes called admittance matrix or Kirchhoff matrix, is a matrix representation of a graph.

Shape Prior

In an energy minimization framework, image segmentation with shape prior is formulated as an energy function with the shape prior coded as a regularization term. The random walk in Equation (4) minimizes an original energy $E_{rw}$. Thus, the general regularization framework for incorporating the shape prior is $$E = E_{rw} + v E_{sp}, \qquad (8)$$

where $E_{sp}$ describes how the segmentation matches with the prior shape, and v is a weight parameter that controls the impact of the shape prior into the spatial random walk. In one embodiment, the weight parameter is correlated with the iteration of the segmentation 150, the iteration index 147. Increase of the iteration index increases the weight parameter.

In one embodiment, we describe the shape prior energy $E_{sp}$ as a shape distance function.

Thus, the shape prior energy $E_{sp}$ is:

$$E_{sp}(\phi, \phi_0) = \int_\Omega (H(\phi(x)) - H(\phi_0(x)))^2 \, dx, \qquad (9)$$

where $\phi$ is a level set function of the segmentation, $\phi_0$ is a level set function of the prior shape, $x \in \Omega$, and $\Omega$ is the domain of integration. H(•) is the unit step side function. We replace H($\phi$) with a harmonic function r and use a smoothed function for the shape prior $\phi_0$ $$H(x) = \frac{1}{2} + \frac{1}{p}\arctan\left(\frac{x}{e}\right), \qquad (10)$$

where $\epsilon$ here is a smoothing factor.

In the image domain, we rewrite Equation (9) as:

$$E_{sp} = \sum_i (r_i - H(\phi_0(i)))^2, \qquad (11)$$

where i is an index of a pixel.

To minimize the energy functional in Equation (8), we solve the linear equation 157:

$$(L+n)r = nH(f_0). \qquad (12)$$

The Equation (12), in one embodiment, is solved using inverse operations and/or least-squares solutions. However, a solution of the Equation (12) requires proper alignment of the prior shape $\phi_0$ to the image, which in turn requires the initialization of r, as described above.

The weight parameter v is selected empirically. However, to favor the shape more as opposed to the intensity/appearance information in the consecutive iterations rather than the initial iterations, in some embodiments, the weight value is increased with the iteration index.

Example Embodiment

In one embodiment, we use of an image color intensity prior probability information in conjunction with the shape prior information. Therefore, our energy term takes the form:

$$E = E_{rw} + v E_{sp} + \gamma E_{color}. \qquad (13)$$

To model $E_{color}$, we use a normalized histogram from the Gaussian distribution kernels for foreground and background seeds. The pixelwise prior probabilities are simply obtained for each unlabeled pixel. $E_{color}$ in Equation (13) leads to faster convergence then using the shape prior alone. Hence, the linear system according to this embodiment is:

$$(L+v+\gamma)r^s \gamma \lambda_U^s + vH(\phi'_0) - B^T m^s, \qquad (14)$$

where s refers to label s, e.g., foreground or background. The weight parameter $\gamma$ is selected empirically to accelerate convergence.

In the shape prior, the smoothing factor $\epsilon$ in H(•) is adjusted during each iteration based on the iteration index. As the segmentation converges to the given shape, the value $\epsilon$ approached to 1 to enforce shape matching. The weight parameter v is selected empirically.

The weights $w_{ij}$ are constructed conventionally:

$$w_{ij}=\exp-\beta(p_i-p_j)^2,$$

where $p_i, p_j$ refer to the i-th and j-th pixel values respectively, and β is the variance for controlling the magnitude of the weights. The value β can be adjusted for different images. In general, if the image contrast is strong, then a smaller β is preferred to emphasize the smoothness of color/intensity variation among the neighboring pixels.

Effect of the Invention

The embodiments of the invention yield improved image segmentation over the conventional segmentation methods.

The conventional random walk is a general purpose segmentation method. However, in the presence of background clutter or in the absence of image intensity/color variation, the segmentation obtained might not be useful if the seeds are misplaced.

Figure 4:
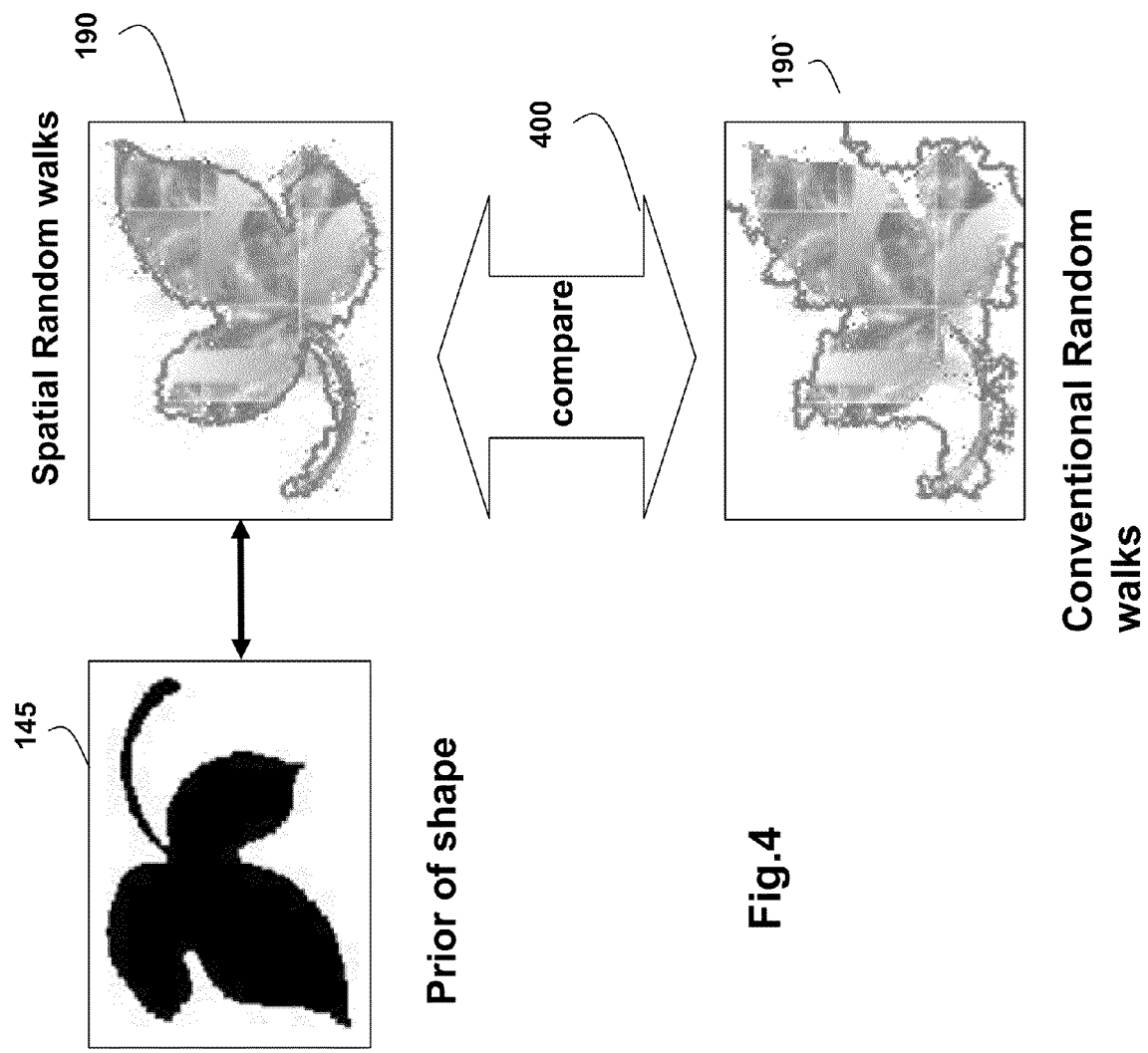
FIG. 4 is block diagram comparing conventional and spatial random walk segmentation.

However, in many practical applications, the prior information is available and can be exploited to improve the segmentation result. For example, FIG. 4 shows that the shape prior information helps to obtain better segmentation result 190 compared to the result 190' obtained from the conventional random walk segmentation method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for segmenting an image, comprising the steps of:
   performing an initial segmentation of the image to produce a previous segmented region;
   segmenting iteratively the image using a spatial random walk based on a shape prior of the previous segmented region to produce a next segmented region, wherein the spatial random walk is minimizing an energy function E with the shape prior according to $E=E_{rw}+vE_{sp}$, wherein $E_{rw}$ is an energy of a random walk segmentation, $E_{sp}$ is an energy of the prior shape, and v is a weight parameter controlling an impact of the shape prior into the spatial random walk;
   comparing the next segmented region with the previous segmented region;
   repeating the segmenting and the comparing until the previous and next segmented regions converge; and
   selecting the next segmented region as a final segmented region.

2. The method of claim 1, further comprising:
   aligning the shape prior with the previous segmented region.

3. The method of claim 2, further comprising:
   smoothing the shape prior.

4. The method of claim 1, further comprising:
   aligning the shape prior with the previous segmented region; and
   smoothing adaptively the shape prior.

5. The method of claim 4, wherein an iteration of the segmenting is associated with an iteration index, and wherein the smoothing adaptively further comprising:
   applying a smoothing function to the shape prior, wherein a parameter of the smoothing function is adjusted based on the iteration index.

6. The method of claim 1, further comprising:
   selecting the shape prior from a set of shape priors.

7. The method of claim 6, wherein the selecting the shape prior further comprising:
   comparing each shape prior in the set of shape priors with the current segmented region to determine a set of similarity scores;
   selecting the shape prior with a highest similarity score from the set of similarity scores.

8. The method of claim 1, further comprising:
   determining a Laplacian matrix of the image.

9. The method of claim 8, wherein the spatial random walk segmentation is according to $$(L+v)r=vH(\phi_0),$$

wherein L is the Laplacian matrix, v is a weight of the shape prior, r is the next segmented region, H(•) is a smoothing function, and $\phi_0$ is the shape prior.

10. The method of claim 9, further comprising:
    choosing the weight adaptively according to an iteration.

11. The method of claim 1, wherein the spatial random walk segmentation using an image color intensity prior information.

12. The method of claim 1, wherein the shape prior is a predetermined shape of the segmented region.

13. The method of claim 1, wherein the shape prior represents a shape of a tumor.

14. The method of claim 1, wherein the energy of the prior shape is a shape distance function.

15. The method of claim 1, wherein the spatial random walk is minimizing an energy function E with the shape prior using a color intensity prior probability according to $$E=E_{rw}+vE_{sp}\gamma E_{color},$$

wherein $E_{rw}$ is an energy of a random walk segmentation, $E_{sp}$ is an energy of the prior shape, v is a weight parameter that controls the impact of the shape prior into the spatial random walk, and γ is a weight parameter controlling an impact of the color intensity prior into the spatial random walk.

16. A method for segmenting an image, comprising the steps of:
    segmenting iteratively an image with a spatial random walk segmentation based on a shape prior to produce a next segmented region until the next segmented region converges with a previous segmented region; selecting the next segmented region as a final segmented region;
    aligning the shape prior with the previous segmented region; and
    smoothing adaptively the shape prior with a smoothing function, wherein the smoothing function is adjusted based on an iteration of the segmenting; and
    rendering the image including the final segmented region.

17. The method of claim 16, wherein the spatial random walk segmentation is according to $$(L+v)r=vH(\phi_0),$$

wherein L is a Laplacian matrix, v is a weight of the shape prior, r is the next segmented region, H(•) is the smoothing function, and $\phi_0$ is the shape prior.

* * * * *